US007664770B2

(12) United States Patent
Jackson et al.

(10) Patent No.: US 7,664,770 B2
(45) Date of Patent: Feb. 16, 2010

(54) SMART BROWSER PANES

(75) Inventors: Lincoln Jackson, West Newbury, MA (US); Thomas Wilde, Wellesley, MA (US)

(73) Assignee: Lycos, Inc., Waltham, MA (US)

( * ) Notice: Subject to any disclaimer, the term of this patent is extended or adjusted under 35 U.S.C. 154(b) by 273 days.

(21) Appl. No.: 10/679,788

(22) Filed: Oct. 6, 2003

(65) Prior Publication Data

US 2005/0076019 A1 Apr. 7, 2005

(51) Int. Cl.
*G06F 17/30* (2006.01)
(52) U.S. Cl. .................. 707/102; 715/760; 715/781
(58) Field of Classification Search ............... 707/102, 707/2, 3; 715/760, 781
See application file for complete search history.

(56) References Cited

U.S. PATENT DOCUMENTS

| | | | | | |
|---|---|---|---|---|---|
| 5,631,825 | A | * | 5/1997 | van Weele et al. | 700/83 |
| 5,835,722 | A | * | 11/1998 | Bradshaw et al. | 709/225 |
| 5,999,929 | A | * | 12/1999 | Goodman | 707/7 |
| 6,026,409 | A | * | 2/2000 | Blumenthal | 707/104.1 |
| 6,052,716 | A | * | 4/2000 | Gibson | 709/217 |
| 6,113,394 | A | * | 9/2000 | Edgar | 434/179 |
| 6,247,020 | B1 | * | 6/2001 | Minard | 707/104.1 |
| 6,615,237 | B1 | * | 9/2003 | Kyne et al. | 709/203 |
| 6,832,355 | B1 | * | 12/2004 | Duperrouzel et al. | 715/788 |
| 6,851,089 | B1 | * | 2/2005 | Erickson et al. | 715/255 |
| 6,876,997 | B1 | * | 4/2005 | Rorex et al. | 707/3 |
| 6,912,532 | B2 | * | 6/2005 | Andersen | 707/10 |
| 6,961,731 | B2 | * | 11/2005 | Holbrook | 707/102 |
| 7,100,123 | B1 | * | 8/2006 | Todd et al. | 715/862 |
| 7,194,546 | B2 | * | 3/2007 | Kameoka et al. | 709/229 |
| 7,424,510 | B2 | | 9/2008 | Gross et al. | |
| 7,512,603 | B1 | * | 3/2009 | Veteska et al. | 707/6 |
| 2001/0038395 | A1 | * | 11/2001 | Holtzblatt et al. | 345/854 |
| 2002/0023023 | A1 | * | 2/2002 | Borecki et al. | 705/26 |
| 2003/0184582 | A1 | * | 10/2003 | Cohen | 345/736 |
| 2004/0049541 | A1 | * | 3/2004 | Swahn | 709/203 |
| 2004/0111671 | A1 | * | 6/2004 | Lu et al. | 715/513 |
| 2004/0122808 | A1 | * | 6/2004 | Martin et al. | 707/3 |
| 2005/0235220 | A1 | * | 10/2005 | Duperrouzel et al. | 715/788 |
| 2005/0256766 | A1 | * | 11/2005 | Garcia et al. | 705/14 |
| 2006/0069618 | A1 | | 3/2006 | Milener et al. | |
| 2006/0218499 | A1 | | 9/2006 | Matthews et al. | |
| 2007/0226192 | A1 | | 9/2007 | Vaca et al. | |
| 2008/0133487 | A1 | * | 6/2008 | Gross et al. | 707/3 |

OTHER PUBLICATIONS

Page et al., "The PageRank Citation Ranking: Bringing Order to the Web", Stanford Digital Library Technology Project: 1998, pp. 1-17.*
http://www.sidestep.com.
Action and Response History in U.S. Appl. No. 11/590,682, retrieved from PAIR on Aug. 12, 2009.

* cited by examiner

*Primary Examiner*—Charles Rones
*Assistant Examiner*—Phuong-Thao Cao
(74) *Attorney, Agent, or Firm*—Fish & Richardson P.C.

(57) ABSTRACT

An article of manufacture and method includes displaying content associated with a universal resource locator (URL) on a graphical user interface (GUI), receiving a first search parameter for a first search engine, displaying a first search result in a first pane of the GUI, the first search result associated with a first search parameter, determining a second search parameter associated with a URL from the first search parameter for a second search engine, displaying a second search result in a second pane of the GUI, the second search result associated with a second search parameter.

21 Claims, 6 Drawing Sheets

SMART BROWSER PANES

TECHNICAL FIELD

This invention relates to a computer system, and more particularly to smart browser panes.

BACKGROUND

On the Internet, a search engine is a coordinated set of programs that can include: a spider, a program that generates an index, and a program that receives a search request. A spider (also called a "crawler" or a "bot") goes to every page or representative pages on a searchable Web site and reads it, using hypertext links on each page to discover and read a site's related pages. A catalog is a program that generates an index from the pages that have been read by the spider. The program that receives a search request compares it to the entries in the index and returns results, often to a graphical user interface (GUI), e.g., a browser, for display to a user. Example search engines, such as Lycos, Google, Yahoo, and AltaVista, index the content of a large portion of the Web and provide results to a user.

SUMMARY

In one aspect the invention features an article of manufacture and a method including displaying content associated with a universal resource locator (URL) on a graphical user interface (GUI), receiving a first search parameter for a first search engine, displaying a first search result in a first pane of the GUI, the first search result associated with a first search parameter, determining a second search parameter associated with a URL from the first search parameter for a second search engine, displaying a second search result in a second pane of the GUI, the second search result associated with a second search parameter.

Embodiments may include one or more of the following. The method can include automatically updating the second pane in response to a change and/or a user navigation in the first pane. The method can include differentiating links viewed in the first pane in the second pane. The method can include allowing a user to view a new web page in the first pane by clicking on the links in both the first and second pane. The method can include parsing the URL and performing a pattern match using the URL. The method can include allowing a user to enter a search in the second pane and displaying the results of the search in the first pane. The method can include displaying a default page when no search results are found. The method can include including a watch list having a URL. The method can include automatically opening a second pane in response to a user navigation to a URL include in the watch list. The method can include periodically updating the watch list. The second pane can be disabled based on a rule. Disabling the second pane based on a rule can include disabling the second pane if no search results are produced or disabling the second pane in response to user input (e.g., a user pressing a button or hyperlink.) The method can include receiving a personal preference from a user. The personal preference can be a language preference, opening preference, size of the second pane, or the display of search results.

The method can include an active mode and a passive mode. The method can include opening a second pane in response to a user input in the passive mode. The method can include automatically opening a second pane in the active mode.

One or more aspects of the invention may provide one or more of the following advantages.

By splitting the GUI into two panes each showing search results for a set of parameters entered into a first search engine in first pane, the application allows a user to compare results of two consecutive searches using two search engines.

The application eliminates a need to manually open multiple windows and manually enter a search parameter multiple times to compare search results from two or more search engines.

Including two modes of operation, active mode and passive mode, allows a user to select a preferred mode of operation. The application also allows the user to customize the search results and display to accommodate the personal preferences of the user.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
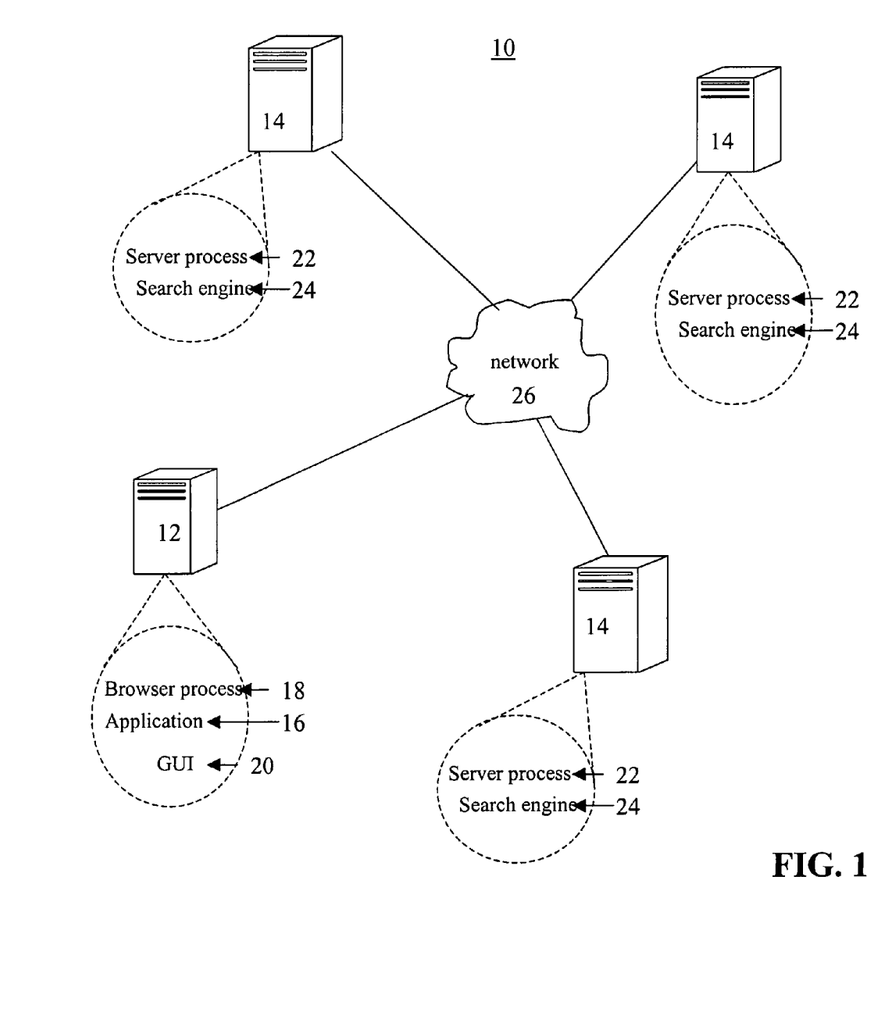
FIG. 1 is a block diagram of a computer system.

As shown in FIG. 1, a system 10 in accordance with the invention includes a client 12 and a server 14. System 10 is a client server network. In a client-server network, one server is activated and awaits client requests. Typically, multiple client programs share the services of a common server program. Client 12 includes an application 16 and a browser process 18 for display of a graphical user interface (GUI) 20. The browser process 18 is an application program that provides a way to look at and interact with the information (content) located throughout the Internet. The browser process 18 is a client program that requests services from a server in another computer on the Internet. Server 14 includes a server process 22 for a search engine 24. Server 14 sends content to client 12 for display on the GUI 20. Server 14 communicates with client 12 over a network 26, for example the Internet.

The application 16 splits the GUI 20 on the client 12 into two panes 52 and 54 (FIG. 2) each showing search results for a set of parameters 58 entered into a first search engine in first pane 52. The application 16 allows a user to compare results of two consecutive searches using two search engines. Thus, application 16 eliminates a need to manually open multiple windows and manually enter a search parameter 58 multiple times to compare search results from two or more search engines. The application 16 can also include a feature to update links in one pane (52 or 54) in response to navigation in the other pane (52 or 54).

Figure 2:
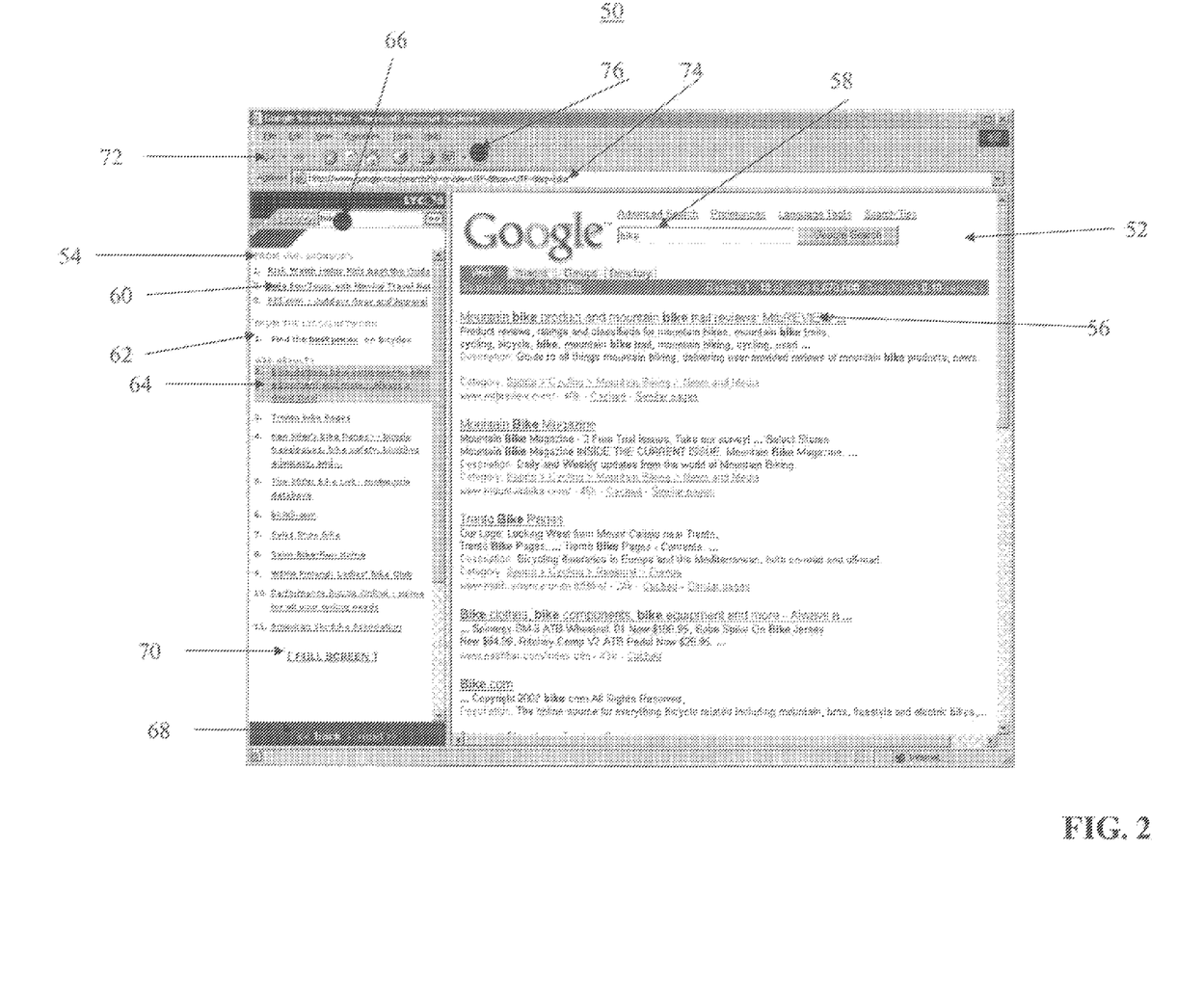
FIG. 2 is a screen shot showing a GUI split into two panes.
Figure 5:
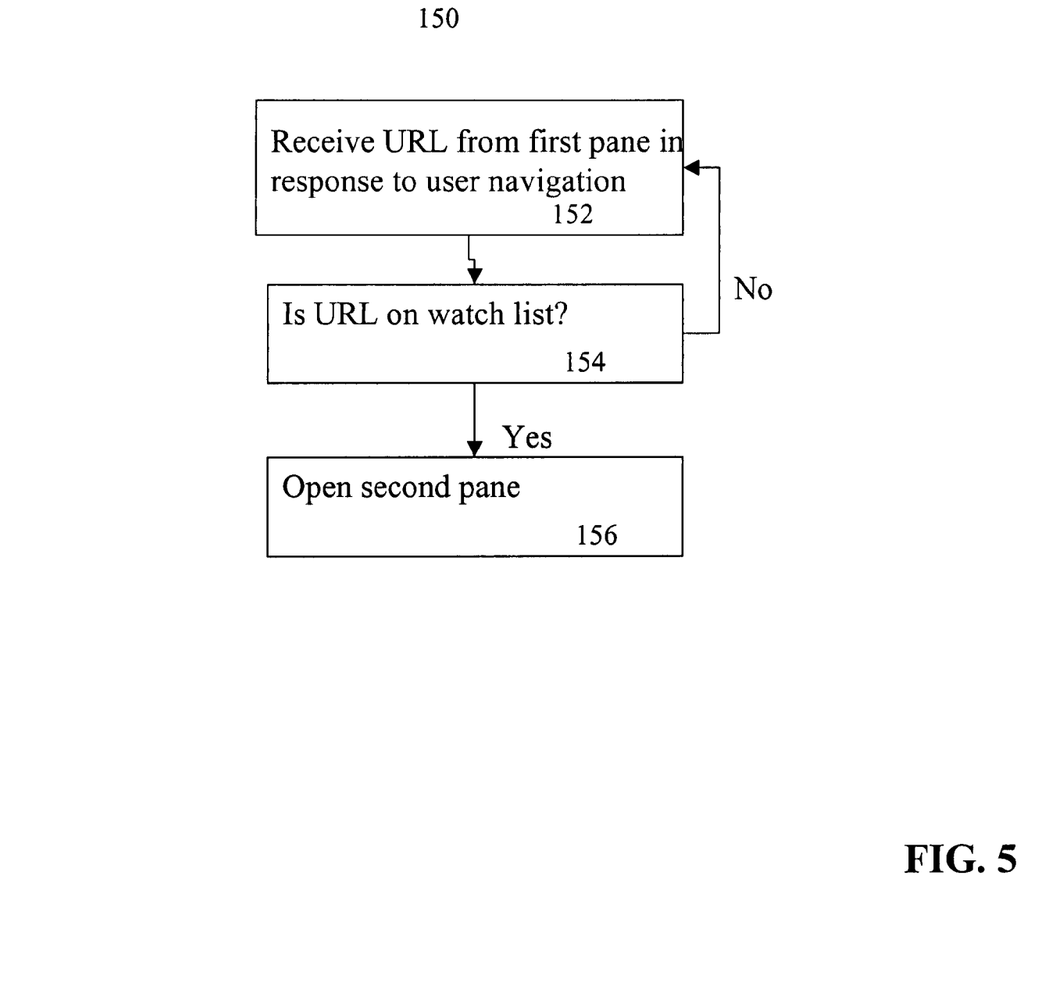
FIG. 5 is a flow chart showing operation of an automatic mode.

As shown in FIG. 2, a screen shot 50 of the GUI 20, illustrates dual panes 52 and 54 generated by application 16. First pane 52 includes a search result 56 from a web search for search parameter 58. Second pane 54 includes the results 60, 62, and 64 from a search using the search parameter 66. Second pane 54 also includes back and next selection buttons 68 and a full screen option button 70. The full screen option allows the user to view the content of the second pane 54 in the first pane 52 by clicking on full screen option button 70. In addition to the two panes 52 and 54 the screen shot 50 shows navigation features 72 associated with a browser such as Netscape Communicator, Mozilla, Opera, or Microsoft Internet Explorer. Address line 74 shows a URL for first pane 52. Second pane 54 opens when a user presses a button 76 and/or opens automatically based on rules included in the application 16 (FIG. 5).

Figure 3:
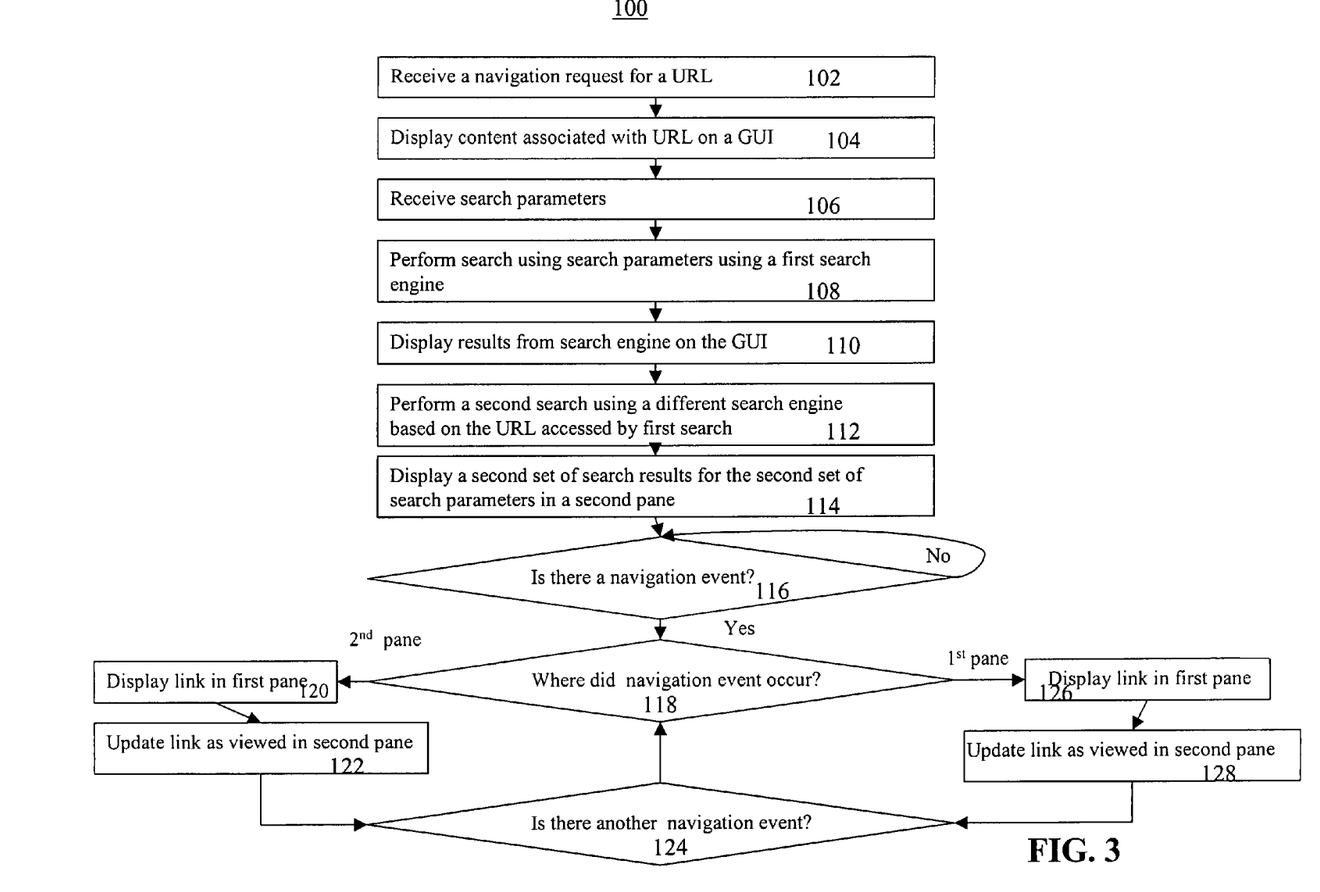
FIG. 3 is a flow chart showing a process for producing a set of search results.

As shown in FIG. 3, a process 100 includes receiving (102) a navigation request for a URL. Based on this navigation request, a client system displays (104) content associated with the URL. The user enters a search parameter 58 for a desired search into a first search engine such as Lycos, Google, Yahoo, or AltaVista which is displayed in the first pane 52. Process 100 receives (106) search parameter 58 and performs (108) a search. Process 100 displays (110) the results of the search on GUI 20. Process 100 performs (112) a second search using a second search engine. The parameters 66 for performing (112) this search are generated from the URL 74 accessed by the first search. Process 100 displays (114) results of the second search in second pane 54 on the GUI 20. Thus, process 100 displays results from two search engines in two separate panes 52 and 54 within a single GUI 20. Process 100 determines (116) if a navigation event occurs in either pane 52 or 54 of the GUI 20. A navigation event can be, for example, a user clicking on a link. If a navigation event occurs, the process 100 determines (118) where the navigation event is located (i.e., in first pane 52 or second pane 54). If the navigation event occurs in first pane 52, the process 100 displays (126) contents of the URL associated with a link in first pane 52. If the link is included in the search results displayed in second pane 54, process 100 updates (128) the link 64 as viewed in second pane 54. After displaying the URL and updating the link 64, process 100 determines (124) if a subsequent navigation event occurs. If the navigation event occurs in second pane 54, the process displays (120) the contents of the URL associated with the link in first pane 52. Process 100 updates (122) the link as viewed in the second pane 54. Process 100 determines (124) if a subsequent navigation event occurs. While in this example, first pane 52 displays the content of the URL associated with the navigation event, the content of the URL can alternately be displayed in second pane 54.

In a specific example, to generate the results shown in FIG. 2, process 100 receives (102) a navigation request for the URL (www.google.com). This URL is associated with the search engine Google. Process 100 displays (104) the contents associated with the URL 74 on GUI 20. A user enters a search parameter to search for the subject "bike." Process 100 receives (106) the search parameter 58 "bike" and the search engine (Google) performs (108) a search for "bike." The search engine generates a list of web pages associated with the subject "bike" and the client 12 displays (110) the results on GUI 20 at client 12. Process 100 performs (112) a second search using a second search engine based on parameters contained in the URL 74 shown in first pane 52. Thus, a second search engine uses the parameter 66 "bike" and generates a second set of search results 60, 62, and 64. Process 100 displays (114) this second set of search results 60, 62, and 64 in second pane 54 of GUI 20. If the user clicks on the link titled "Bike clothes, bike components, bike equipment and more—always a . . ." in first pane 52, process 100 determines (118) that the navigation occurs in first pane 52 and displays the URL in first pane 52. Process 100 also updates (128) the viewed link 64 associated with this web page in second pane 54 to differentiate this viewed link 64 from the links not viewed 60 and 62. In this example, an area around link 64 is shaded to differentiate viewed 64. Subsequently, the process 100 determines (124) if another navigation occurs. If the user clicks on the link in second pane 54 to view the web site associated with "American Ski-Bike Association" the process determines (118) that the navigation event occurred in second pane 54 and displays (120) the contents associated with the link in first pane 52. Process 100 then updates (122) the viewed link.

While in this example, second pane 54 is located to the left of first pane 52 and has a smaller size relative to first pane 52, the size and location of second pane 54 can vary. While in this example, gray shading around the viewed link 64 differentiates the viewed link 64 from other links 60 and 62, other ways of differentiating viewed links can be used.

Figure 4:
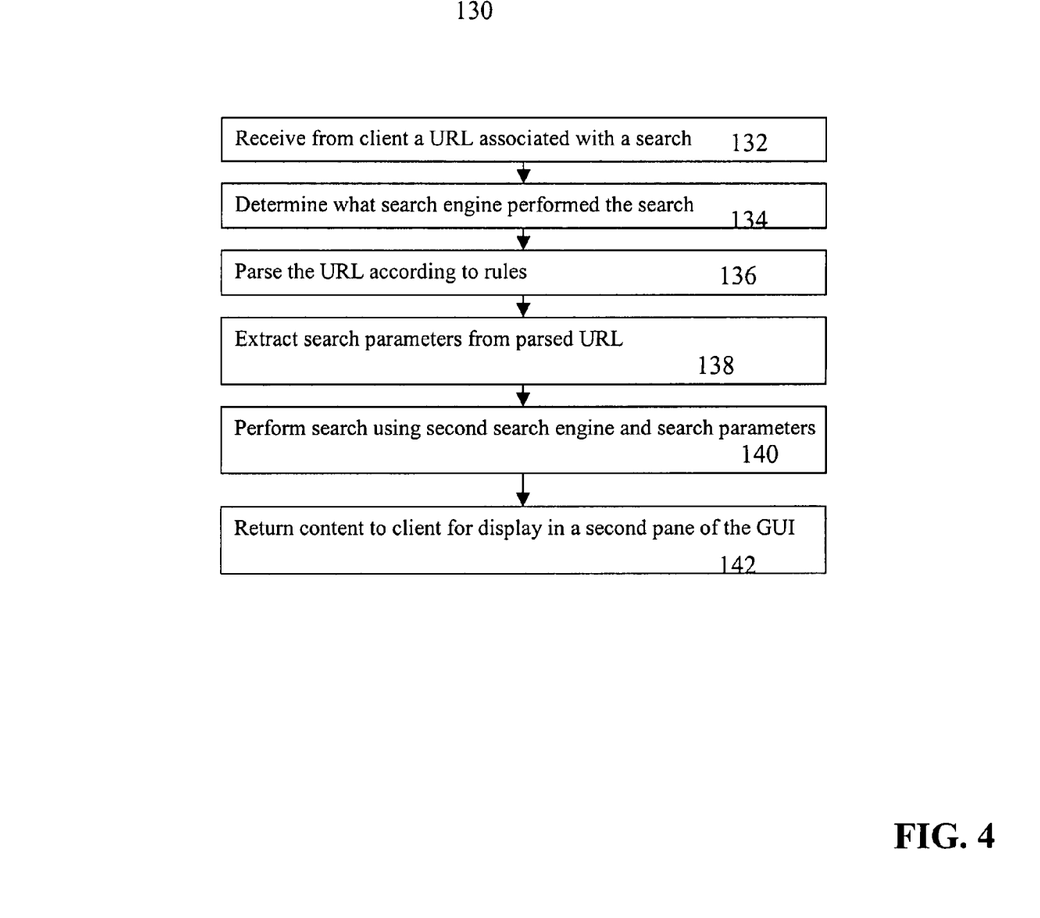
FIG. 4 is a flow chart showing a process for performing a search.

FIG. 4 shows a process 130 for performing the second search (of process 100). The second search is based on a URL 74 accessed by a first search engine. Process 130 includes receiving (132) from client 12 URL 74 (including parameters and post data) associated with the search results from the first search engine. Process 130 determines (134) which search engine performed the search and parses (136) URL 74 (accessed by first search engine) according to rules associated with the particular search engine. Process 130 extracts (138) search parameters from URL 74 (accessed by first search engine) and performs (140) a search using the second search engine and the extracted parameters. Process 130 then returns (142) a second URL associated with the results of the second search engine to client 12. Client 12 displays the second URL in the second pane 54 of the GUI 20.

For example, the search "Gardner-John" on a first search engine (e.g. ABCengine) would be captured as the following URL 58:

http://www.ABCengine.com/search?hl=en&ie=UTF-8&oe=UTF-8&q=Gardner+-John&btnG=ABCengine+Search.

The process 130 receives (132) this URL and determines (134) that the URL is associated with ABC engine (i.e. ABCengine performed the search). Process 130 parses (136) the URL according to rules. In this example, process 130 parses the URL to include the segments below.

hl=en
ie=UTF-8
oe=UTF-8
q=Gardner+-John
btnG=ABCengine+Search.

From this parsing, process 130 extracts (138) the search parameters "q" to be Gardner and John. Process 130 performs (140) a search for the extracted parameters using a second search engine and generates a second URL associated with the results of the second search engine. Process 130 returns (142) the second URL to client 12. Upon receipt, the client 12 displays (114 of process 100) the results based on the second URL second pane 54.

Application 16 can include two modes of operation, an automatic mode and a manual mode. In manual mode, second pane 54 opens in response to a navigation event at client 12. For example, the user presses button 76. Other types of buttons include a desktop icon shortcut, a browser toolbar button, a shortcut in browser favorites (bookmarks), a shortcut in browser "Links", a menu pick at the top level of Window's Start menu, a menu pick in the Programs sub-menu of Window's Start menu, and shortcut in Quick Launch toolbar (normally next to Start button). When a user manually clicks button 76 to launch second pane 54, second pane 54 displays a specified URL. For all of these "client-side" buttons, links, shortcuts and icons, a "default page" is shown in second pane 54 until a search is performed in either first pane 52 or second pane 54. When the search is performed, second pane 54 performs process 100 (as described in FIG. 3) to produce a second set of search results for display in second pane 54.

As shown in FIG. 5, in automatic mode, a process 150 does not rely on a user clicking a button 76 (or performing some other manual operation, like entering a set of keystrokes) to open second pane 54. Instead, application 16 at client 12 includes a watch list of URL's. The watch list is a list of URL's that controls the automatic opening of second pane 54. A portion of the URL 74 should match one of the URLs in the watch list if auto-opening is to occur. When using automatic mode, process 150 receives (152) a URL in response to user navigation. The process 150 compares (154) this URL to the URL's included in the watch list. When the process 150 compares (154) the URL to the watch list, and the URL corresponds to a URL on the watch list, the process 150 opens (156) second pane 54. Subsequently, a set of search results is generated according to process 100 and 130 as described above.

As described above, the automatic open function relies on the watch list. Examples of URLs which may be included in the watch list include: Lycos (http://search.lycos.com/default.asp?), Google (http://www.google.com/search?), Yahoo (http://search.yahoo.com/bin/search?), AOL (http://search.aol.com/dirsearch.adp?), MSN (http://search.msn.com/results.asp?), Askjeeves (http://www.askjeeves.com/main/askjeeves.asp?), Altavista (http://www.altavista.com/sites/search/web?), Looksmart (http://www.looksmart.com/r_search?), Netscape (http://search.netscape.com/nscp_results.adp?), and Overture (http://www.overture.com/d/search/?). The watch list may be stored on the client 12 such that the comparison between a URL 58 accessed by the user and the URLs in the watch list occurs on the client 12. This provides an advantage of reducing traffic across network 26. Application 16 can also include a process for updating the watch list stored on client 12. Application 16 updates the watch list based on information in server 14. For example, the watch list can be updated in response to a change in a web search string or an addition of a new search engine. In another example, the watch list includes the functionality for user updates at client 12. For example, a user update may include turning the "automatic open" function on or off for a particular search engine. In another example, the watch list is stored on server 14. In this case, the client 12 passes each URL 74 accessed to server 14 for comparison with the watch list.

Figure 6:
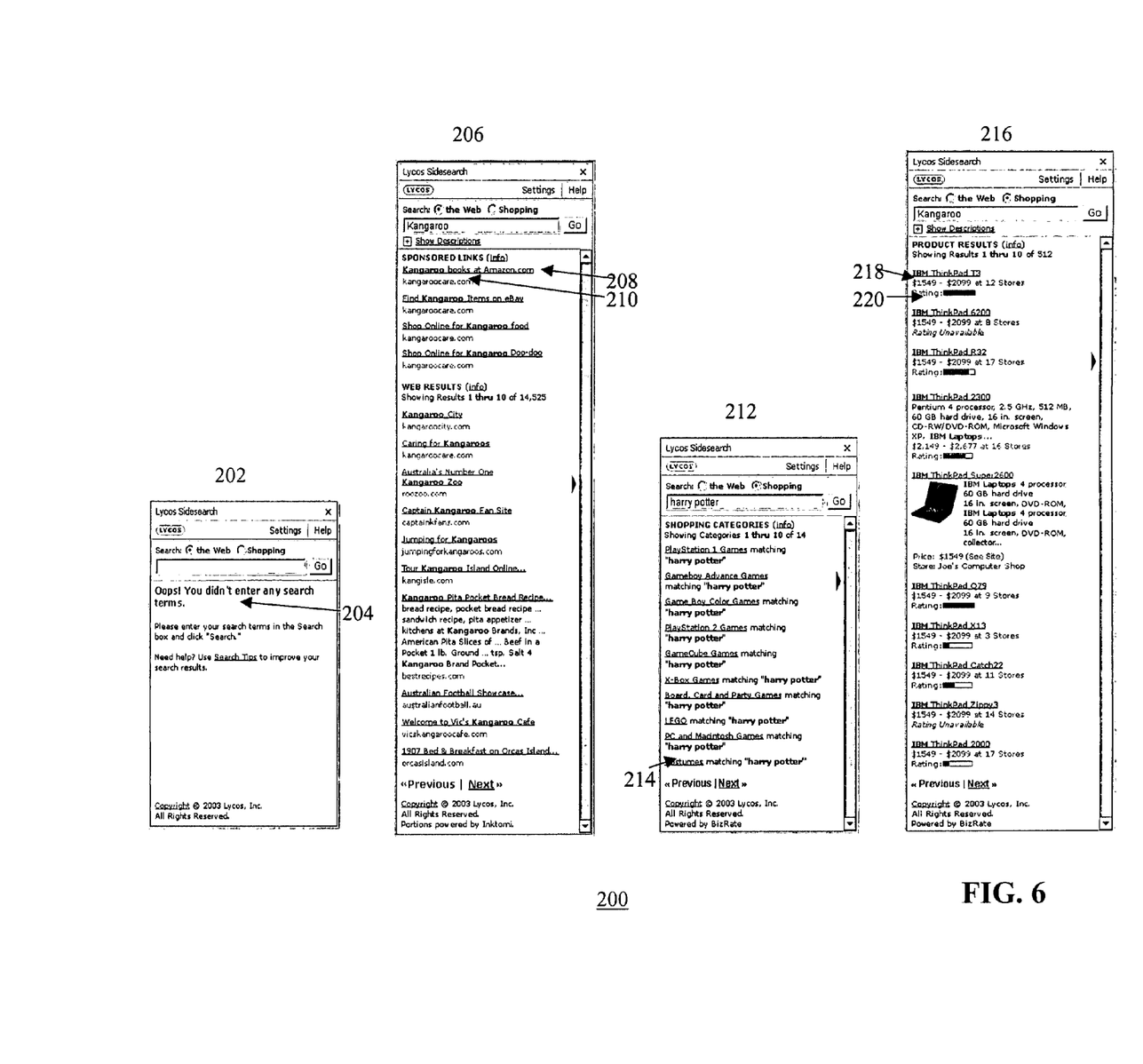
FIG. 6 is a set of screen shots for a second pane of a GUI.
Like reference symbols in the various drawings indicate like elements.

FIG. 6 shows examples of variations of content for display in second pane 54. Pane 202 includes an error message. An error message 204 can be generated if a search does not produce any results, or if a web page can not be viewed. Pane 206 includes a link 208 and the URL 210 associated with the link. Including the URL can allow a user to determine if the link is of interest. Pane 212 includes categorized results. In this example, clicking on a category, for example costumes 214 displays a list of search results for the search parameter that fall into a category of costumes. Categorization can make the list of links easier for the user to understand. Pane 216 includes prices 218 and ratings 220 for various items.

While, the preceding examples have shown results for web pages using a search engine, the system could also produce shopping results, image searches, music searches, etc. In the example of shopping searches, first pane 52 includes a search for a shopping item and second pane 54 displays results of a search for the same or similar items. This provides a user with an easy alternative to searching multiple sites to compare prices and ratings for a single item.

In another example, the application 18 can be customized. Examples of customizations include size and location of second pane 54, language preference of the user, watch list preferences, active or passive mode preference, and other display preferences. The application can also include a disabling feature to turn off second pane 54.

While in the preceding examples, the application 18 splits the GUI 20 into two panes, the GUI 20 can be split into any number of panes. For example, the application 18 splits the GUI 20 into four panes and displays the search results from four search engines based on a set of parameters entered for the first search engine. Splitting the GUI 20 into multiple panes increases the comparisons available to the user, but the size of a monitor limits the number of practical panes displayed.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A method comprising:
   displaying content associated with a uniform resource locator (URL) on a graphical user interface (GUI) executing on a client computer;
   receiving a first search parameter for a first search engine;
   displaying, in a first pane of the GUI, a first search result generated by the first search engine, the first search result comprising URL links to web pages associated with the first search parameter;
   parsing a URL associated with the first search result from the first search engine to extract a second search parameter for a second search engine, the second search engine being a different search engine from the first search engine;
   communicating the second search parameter from the client computer to the second search engine to cause the second search engine to perform a search based on the second search parameter;
   displaying, in a second pane of the GUI, a second search result generated by the second search engine, the second search result being different from the first search result and comprising URL links to web pages associated with the second search parameter, the second pane being generated if the URL or a portion of the URL matches an entry in a predefined list, entries in the list corresponding to search engines and being configured to allow the second pane to be generated automatically for a particular search engine;
   automatically updating the second search result in the second pane in response to a first change in the first search result in the first pane; and
   automatically updating the first search result in the first pane in response to a second change in the second search result in the second pane.

2. The method of claim 1 wherein the second change comprises a user navigation in the second pane.

3. The method of claim 1 wherein the first change comprises a user navigation in the first pane.

4. The method of claim 3 wherein the user navigation comprises:
   a user selecting a URL link included in the first search result in the first pane of the GUI; and
   wherein automatically updating the second search result in the second pane comprises:
   updating a link in the second pane in response to the link viewed in the first pane.

5. The method of claim 1 further comprising:
   permitting viewing of a new web page in the first pane by clicking on links in both the first and second panes.

6. The method of claim 1 further comprising:
   allowing entering of a search in the second pane; and
   displaying results of the search in the first pane.

7. The method of claim 1 further comprising:
   displaying a default page when no search results are generated.

8. The method of claim 1, further comprising:
   periodically updating the predefined list.

9. The method of claim 1 further comprising:
   disabling the second pane based on a rule.

10. The method of claim 9 wherein the rule comprises disabling the second pane if no search results are generated.

11. The method of claim 9 wherein the rule comprises disabling the second pane in response to external input.

12. The method of claim 11 wherein the external input comprises an input received via a button or hyperlinik.

13. The method of claim 1 further comprising:
    receiving a personal preference from an external source.

14. The method of claim 13 wherein the personal preference includes a language preference, an opening preference, a size of the second pane, or the second search result.

15. The method of claim 1 further comprising:
    opening the second pane in response to an input in a passive mode.

16. The method of claim 1 further comprising:
    automatically opening the second pane in an active mode.

17. The method of claim 1, wherein displaying the first search result comprises:
    displaying addresses associated with the first search result, and
    wherein displaying the second search result comprises:
    displaying addresses associated with the second search result.

18. One or more machine readable storage media for storing instructions that are executable, the instructions for causing one or more processing devices to:
    display content associated with a uniform resource locator (URL) on a graphical user interface (GUI) executing on a client computer;
    receive a first search parameter for a first search engine;
    display, in a first pane of the GUI, a first search result generated by the first search engine, the first search result comprising URL links to web pages associated with the first search parameter;
    parsing a URL associated with the first search result from the first search engine to extract a second search parameter for a second search engine, the second search engine being a different search engine from the first search engine;
    communicate the second search parameter from the client computer to the second search engine to cause the second search engine to perform a search based on the second search parameter;

display, in a second pane of the GUI, a second search result generated by the second search engine, the second search result being different from the first search result and comprising URL links to web pages associated with the second search parameter, the second pane being generated if the URL or a portion of the URL matches an entry in a predefined list, entries in the list corresponding to search engines and being configured to allow the second pane to be generated automatically for a particular search engine;

automatically update the second search result in the second pane in response to a first change in the first search result in the first pane; and automatically update the first search result in the first pane in response to a second change in the second search result in the second pane.

19. The one or more machine readable storage media of claim 18 wherein the second change comprises a user navigation in the second pane.

20. The one or more machine readable storage media of claim 18 wherein the first change comprises a user navigation in the first pane.

21. An apparatus, comprising:
a computer system including a processor and memory; and
a machine readable storage medium storing a program product comprising instructions that when executed cause the computer system to:
display content associated with a uniform resource locator (URL) on a graphical user interface (GUI) executing on a client computer;
receive a first search parameter for a first search engine;
display, in a first pane of the GUI, a first search result generated by the first search engine, the first search result being associated with the first search parameter;
parse a URL associated with the first search result from the first search engine to extract a second search parameter for a second search engine, the second search engine being a different search engine from the first search engine;
communicate the second search parameter from the client computer to the second search engine to cause the second search engine to perform a search based on the second search parameter;
display, in a second pane of the GUI, a second search result generated by the second search engine, the second search result being different from the first search result and being associated with the second search parameter, the second pane being generated if the URL or a portion of the URL matches an entry in a predefined list, entries in the list corresponding to search engines and being configured to allow the second pane to be generated automatically for a particular search engine;
automatically updating the second search result in the second pane in response to a first change in the first search result in the first pane; and
automatically updating the first search result in the first pane in response to a second change in the second search result in the second pane.

* * * * *

UNITED STATES PATENT AND TRADEMARK OFFICE
CERTIFICATE OF CORRECTION

PATENT NO. : 7,664,770 B2
APPLICATION NO. : 10/679788
DATED : February 16, 2010
INVENTOR(S) : Jackson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 648 days.

Signed and Sealed this

Twenty-eighth Day of December, 2010

David J. Kappos
*Director of the United States Patent and Trademark Office*